J. A. ROSE.
Washing-Machines.

No. 152,918.

Patented July 14, 1874.

Witnesses:
L. N. Keating
Louis C. Taylor

Inventor:
Judson A. Rose

UNITED STATES PATENT OFFICE.

JUDSON A. ROSE, OF HILLSDALE, MICHIGAN, ASSIGNOR TO RICHARD C. BIRD, OF SAME PLACE.

IMPROVEMENT IN WASHING-MACHINES.

Specification forming part of Letters Patent No. 152,918, dated July 14, 1874; application filed September 11, 1873.

*To all whom it may concern:*

Be it known that I, JUDSON A. ROSE, of Hillsdale, in the county of Hillsdale and State of Michigan, have invented certain new and useful Improvements in Washing-Machines, of which the following is a full and exact description, reference being had to the accompanying drawing forming a part of this specification, and in which—

Figure 1:
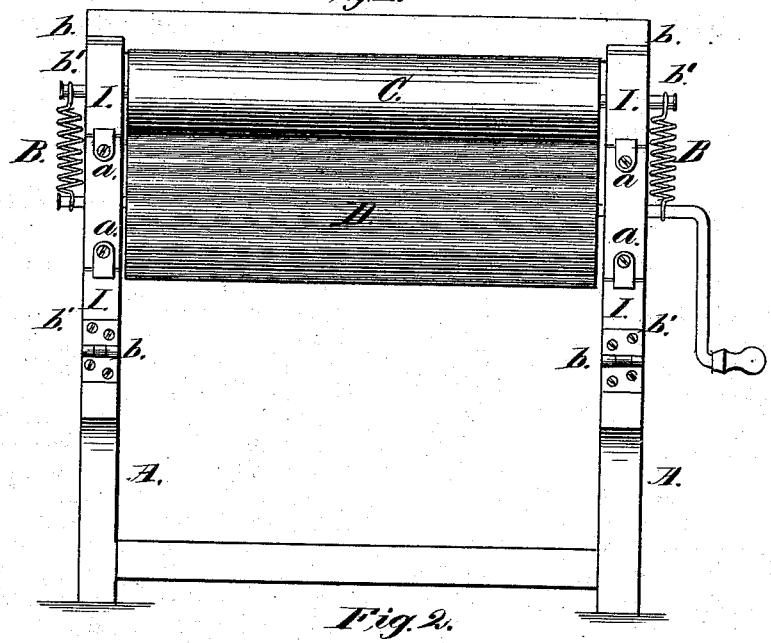
Figure 2:
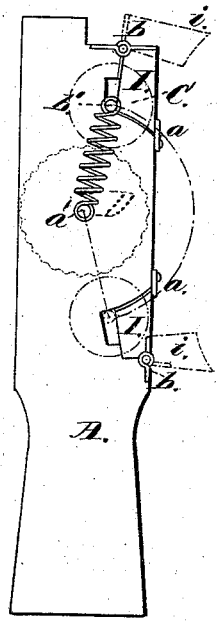

Figure 1 represents a front elevation of a machine embodying my invention, and Fig. 2 is an elevation, showing that end of the machine which is at the left hand in Fig. 1.

My invention relates to that class of washing-machines in which a large fixed corrugated roller is employed in connection with a small roller.

The object of my invention is to so arrange the small roller that it may be adjusted and reversed, thereby adapting it to a large or small quantity of water, and also capable of a spreading movement adapted to a large or small quantity of clothes by means of a spiral spring which is attached to the bearings of each roller and operates to counteract the pressure of the bearings on the ends of the machine. It also consists in certain other novel features relating to the construction of the machine, all of which I will hereinafter fully describe and set forth.

In the drawing, like letters of reference indicate like parts.

A represents the ends of the machine, and $a'$ is a perforation in the ends. D is a large corrugated roller, having its bearing in the perforations $a'$. C is a small roller having an adjustable bearing in slots $b'$, by which it may be adjusted and reversed, adaptable to a large or small quantity of water, or any differences or inequalities in the quantity or thickness of the clothes. I are stops fastened to the ends A by the buttons A, which hold the bearings of the roller C in the slots $b'$, and are for the purpose of reversing the roller C, so that it can be used above or below the large roller D. $b$ are hinges, used on stops I, as seen in Fig. 2. B B are spiral springs, attached to the bearings of the rollers C and D, that have their bearings in the slots $b'$ and perforations $a'$, as is more fully shown in Fig. 2, and are capable of a spreading movement, as heretofore described, and also operate to counteract the pressure of the bearings on the end boards of the machine. $jj$, in Fig. 2, represent the working of the stops I, and $c$ represents the position of the roller C in changing from one slot to the other. E is a crank attached to the roller D for the purpose of operating the machine, the clothes being fed between the large and small rollers.

What I claim as my invention, and desire to secure by Letters Patent, is—

The small roller C, provided with the springs B B, and having bearings in the slots $b'$ cut in the ends A A, and secured by the stops I, in combination with the corrugated roller D, having fixed bearings in the ends A A, substantially as and for the purposes specified.

JUDSON A. ROSE.

Witnesses:
 L. N. KEATING,
 LOUIS C. TAYLOR.